(12) United States Patent
Huelke et al.

(10) Patent No.: US 8,876,200 B2
(45) Date of Patent: *Nov. 4, 2014

(54) MAGNETIC VEHICLE ATTACHMENT SYSTEM FOR USE WITH NON-MAGNETIC BODY STRUCTURE

(75) Inventors: David Huelke, Milan, MI (US); Justin Lee Healy, Canton, MI (US); James Allen Stec, Brownstown, MI (US); Todd Jared Konet, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/536,215

(22) Filed: Jun. 28, 2012

(65) Prior Publication Data

US 2014/0001321 A1    Jan. 2, 2014

(51) Int. Cl.
*B60R 13/02* (2006.01)

(52) U.S. Cl.
CPC ......... *B60R 13/0212* (2013.01); *B60R 13/0206* (2013.01)
USPC ........ 296/214; 296/1.08; 248/206.5; 248/343

(58) Field of Classification Search
USPC ............. 296/1.08, 39.1, 191, 214; 248/206.5, 248/229.16, 229.26, 228.7, 226.11, 343; 52/506.01, 506.05, 506.06
See application file for complete search history.

(56) References Cited

U.S. PATENT DOCUMENTS

| | | | |
|---|---|---|---|
| 2,009,648 A | 7/1935 | Hall | |
| 2,099,649 A | 11/1937 | Hall | |
| 2,876,359 A | 3/1959 | Plymale | |
| 3,361,404 A | 1/1968 | Lohr | |
| 3,378,974 A | 4/1968 | Bush, Jr. | |
| 3,651,796 A | 3/1972 | Nelson | |
| 3,895,332 A | 7/1975 | Box | |
| 4,095,837 A | 6/1978 | Hunter | |
| 4,317,589 A | 3/1982 | Kuss | |
| 4,835,923 A | 6/1989 | Ybarra | |
| 4,934,119 A | 6/1990 | Ybarra | |
| 5,016,934 A * | 5/1991 | Pelz | 296/214 |
| 5,280,991 A | 1/1994 | Weiland | |

(Continued)

FOREIGN PATENT DOCUMENTS

| | | |
|---|---|---|
| JP | 2007232199 A | 9/2007 |
| JP | 2009220648 A | 10/2009 |

OTHER PUBLICATIONS

Japanese to English translation of JP 2007-232199, retreived Dec. 3, 2013 from the JPO website, http://www4.ipdl.inpit.go.jp/Tokujitu/PAJdetail.ipdl?N0000=60&N0120=01&N2001=2&N3001=2007-232199.*

(Continued)

*Primary Examiner* — Glenn Dayoan
*Assistant Examiner* — Jason S Daniels
(74) *Attorney, Agent, or Firm* — Vichit Chea; Price Heneveld LLP

(57) ABSTRACT

A vehicle headliner attachment system for mounting a headliner to a non-magnetic roof structure includes a headliner having an interior and an exterior surface, a ferromagnetic plate attached to the exterior surface of the headliner, and a magnetic clip assembly affixed to the non-magnetic roof structure. The ferromagnetic plate and magnetic clip assembly enable magnetic attachment of the headliner to the non-magnetic roof structure.

18 Claims, 3 Drawing Sheets

(56) References Cited

U.S. PATENT DOCUMENTS

| | | | |
|---|---|---|---|
| 6,305,656 | B1 | 10/2001 | Wemyss |
| 6,857,809 | B2 * | 2/2005 | Granata ........................ 403/121 |
| 7,306,190 | B2 | 12/2007 | Tisol, Jr. |
| 8,042,308 | B2 | 10/2011 | Sullivan et al. |
| 8,287,034 | B2 * | 10/2012 | Smith et al. ................... 296/191 |
| 2002/0130231 | A1 | 9/2002 | Winnard |
| 2009/0211065 | A1 | 8/2009 | Moerke |
| 2010/0289288 | A1 | 11/2010 | Smith et al. |
| 2011/0083254 | A1 | 4/2011 | Trutna et al. |
| 2011/0140474 | A1 | 6/2011 | Smith et al. |
| 2012/0126583 | A1 * | 5/2012 | Brown et al. ................. 296/210 |

OTHER PUBLICATIONS

U.S. Appl. No. 13/536,233, filed Jun. 28, 2012, filing receipt (3 pages), patent application and drawings (18 pages).

* cited by examiner

MAGNETIC VEHICLE ATTACHMENT SYSTEM FOR USE WITH NON-MAGNETIC BODY STRUCTURE

FIELD OF THE INVENTION

The present invention generally relates to a system for attaching a trim component to a vehicle body structure, and more particularly for magnetically attaching a headliner to a non-magnetic vehicle roof.

BACKGROUND OF THE INVENTION

The body structure of a vehicle roof typically includes a roof panel and several roof headers and bows, which are closed-section or channel-shaped structures secured to the vehicle body that extend along the length and across the width of the vehicle roof to provide support for the roof panel. The roof panel and roof headers and bows are commonly fabricated from stamped sheet metal. A headliner is normally attached to the interior side of the roof structure to provide an attractive appearance for the interior of the vehicle. Headliners have been attached to the roof of vehicles in a variety of manners, including using screw or snap-in fasteners, adhesives, magnets, and hook and loop type fasteners such as VELCRO.

Recently, an interest in reducing vehicle weight has led manufactures to use lighter materials, such as aluminum, for vehicle roof panels, headers, and bows. Using aluminum eliminates the ability to magnetically attach components to the roof structure because aluminum is not magnetically attachable.

SUMMARY OF THE INVENTION

One aspect of the present invention includes a vehicle headliner attachment system for mounting a headliner to a non-magnetic roof structure. The attachment system includes a headliner having an interior and an exterior surface, a ferromagnetic plate attached to the exterior surface of the headliner, and a magnetic clip assembly affixed to the non-magnetic roof structure. The ferromagnetic plate and magnetic clip assembly enable magnetic attachment of the headliner to the non-magnetic roof structure.

Another aspect of the present invention includes a vehicle attachment system for mounting a trim component to a non-magnetic body structure. The attachment system includes the trim component, a magnetic clip assembly affixed to one of the trim component and the body structure, and a ferromagnetic plate mounted to the other of the trim component and the body structure. The magnetic clip assembly and the ferromagnetic plate enable magnetic attachment of the trim component to the non-magnetic body structure.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
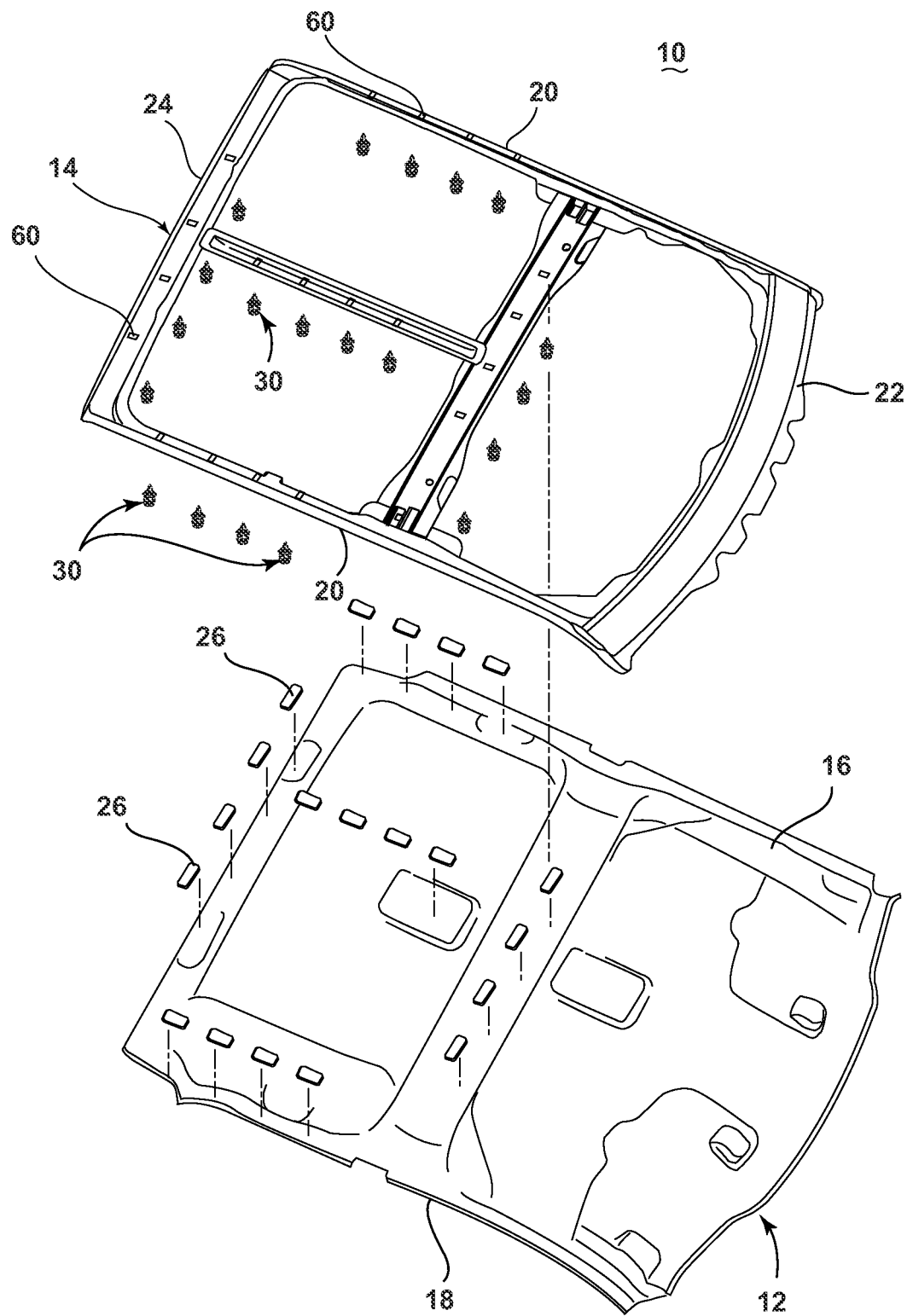
FIG. 1 is a top perspective, exploded view of a vehicle attachment system, according to one embodiment.

For purposes of description herein, the terms "upper," "lower," "right," "left," "rear," "front," "vertical," "horizontal," "interior," "exterior," and derivatives thereof shall relate to the vehicle attachment system as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, reference numeral 10 generally designates a vehicle attachment system for mounting a trim component 12, such as a headliner, to a non-magnetic body structure 14 of an automotive vehicle. In the illustrated embodiment, the trim component 12 is shown in the form of a headliner; however, other trim components, including pillar trim, interior panels, and the like are contemplated according to other embodiments. Further, the body structure 14 is shown in the form of a roof structure; however, other body structures, including pillars, body panels, and the like are contemplated.

The headliner 12 may be a formed and molded headliner for mounting to the interior of the roof structure 14 of the vehicle, so as to provide an aesthetically pleasing appearance for the interior thereof. The headliner 12 has an exterior surface 16 which faces the supporting roof structure 14 when installed in the vehicle, and an opposite, interior surface 18 that is upholstered to provide a decorative surface visible from the interior of the vehicle. The headliner 12 is shaped to conform to the roof structure 12 and may include a plurality of contours and apertures for mounting various overhead components, such as sun visors, overhead consoles, grab handles, lights, and the like. The roof structure 14 includes a pair of spaced side rails 20, and at least a front header 22, a rear header, 24, and may also include additional roof bows, as is conventional. The roof structure 14 is formed of non-magnetic material, such as aluminum, or any other suitable material.

The headliner attachment system 10 further includes a ferromagnetic plate 26 affixed to the exterior surface 16 of the headliner 12. The ferromagnetic plate 26 is made of a ferrous metal, such as iron, nickel, cobalt, certain steels and metal alloys, or any other suitable material that is capable of attracting a magnet. In the illustrated example, a plurality of ferromagnetic plates 26 is spaced about the exterior surface 16 of the headliner 12. The plates 26 can be bonded to the surface 16 by a layer of hot melt adhesive (not shown). Of course, other glues, adhesives, or means of attaching the plates 26 to the headliner 12 are also feasible.

Figure 2:
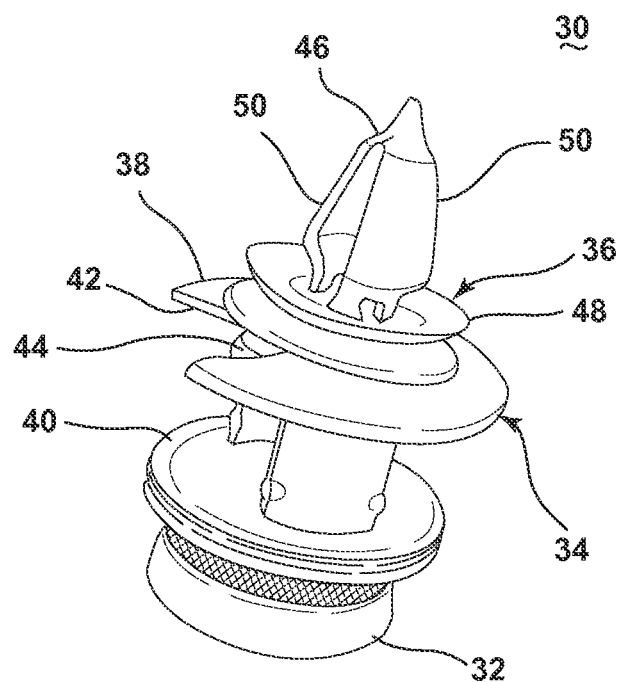
FIG. 2 is top perspective view of a magnetic clip assembly of the vehicle attachment system of FIG. 1, according to one embodiment.

Referring now to FIG. 2, the headliner attachment system 10 also includes a magnetic clip assembly 30, according to one embodiment. The magnetic clip assembly 30 includes a magnet 32, a carrier 34, and a fastener 36. The magnet 32 is made of a material that has its own persistent magnetic field, even in the absence of an applied magnetic field. Examples of such types of magnetic metals include iron ore, cobalt, and nickel.

The carrier 34 has a top plate 38 and a bottom plate 40 that may be configured to include a space therebetween. Additionally, the top plate 38 includes an opening in the shape of a keyhole 42. The carrier 34 may be made from plastic material and is molded in a single piece.

The fastener 36 has a head 44, a snap-in foot 46, a skirt 48, and may have a barrel (not shown) which are co-axially aligned and typically have a circular shape. The gap between the head 44 and the skirt 48, which is equal to the height of the barrel, is sized and configured to receive the top plate 38 of the carrier 34. The fastener 36 is assembled to the carrier 34 by inserting the head 44 of the fastener 36 into the keyhole 42. The snap-in foot 46 includes at least two flexible flanges 50. The fastener 36 is of the type commonly referred to in the automotive industry as a bird's beak fastener.

The components of the magnetic clip assembly 30 are co-axially aligned and the carrier 34 is positioned between the magnet 32 and the fastener 36. The magnet 32 is adhered to the bottom plate 40 of the carrier 34 according to one embodiment. Optionally, the magnet 32 may be adhered to the bottom plate 40 by a foam pad having adhesive on its top and bottom surfaces. The fastener 36 is removably assembled to the top plate 38, via the keyhole 42, as described above. Although not shown in the figures, it should be noted that, according to another embodiment, the fastener 36 and carrier 34 may be integrally formed as a single component.

Figure 3:
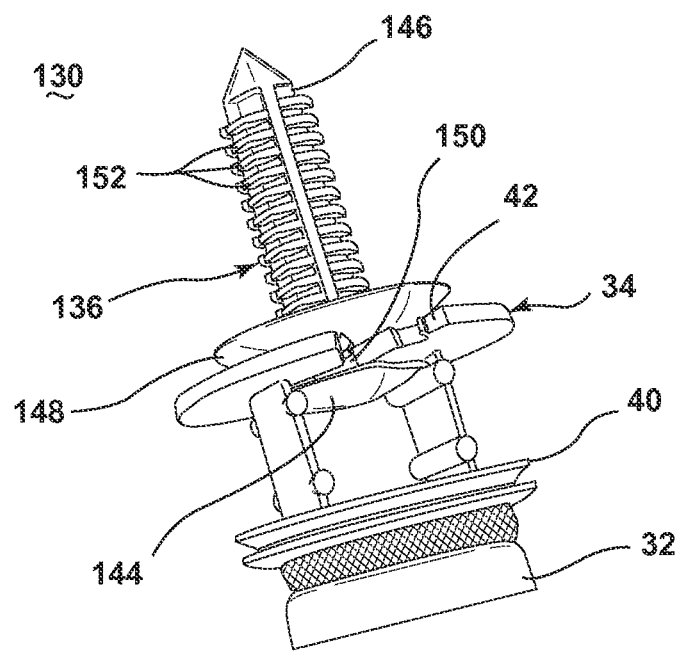
FIG. 3 is a bottom perspective view of a magnetic clip assembly of the vehicle attachment system of FIG. 1, according to another embodiment.

Referring to FIG. 3, a second embodiment of a magnetic clip assembly 130 for use with the headliner attachment system 10 is illustrated. The magnetic clip assembly 130 includes the carrier 34 and magnet 32, and a fastener 136. The fastener 136 has a head 144, a snap-in foot 146, a skirt 148, and a barrel 150 which are co-axially aligned and typically have a circular shape. The gap between the head 144 and the skirt 148, which is equal to the height of the barrel 150, is sized and configured to receive the top plate 38 of the carrier 34. The fastener 136 is assembled to the carrier 34 by inserting the head 144 of the fastener 136 into the keyhole 42. The snap-in foot 146 includes a plurality of annular ribs 152. The fastener 136 is of the type commonly referred to in the automotive industry as a Christmas tree fastener.

Figure 4:
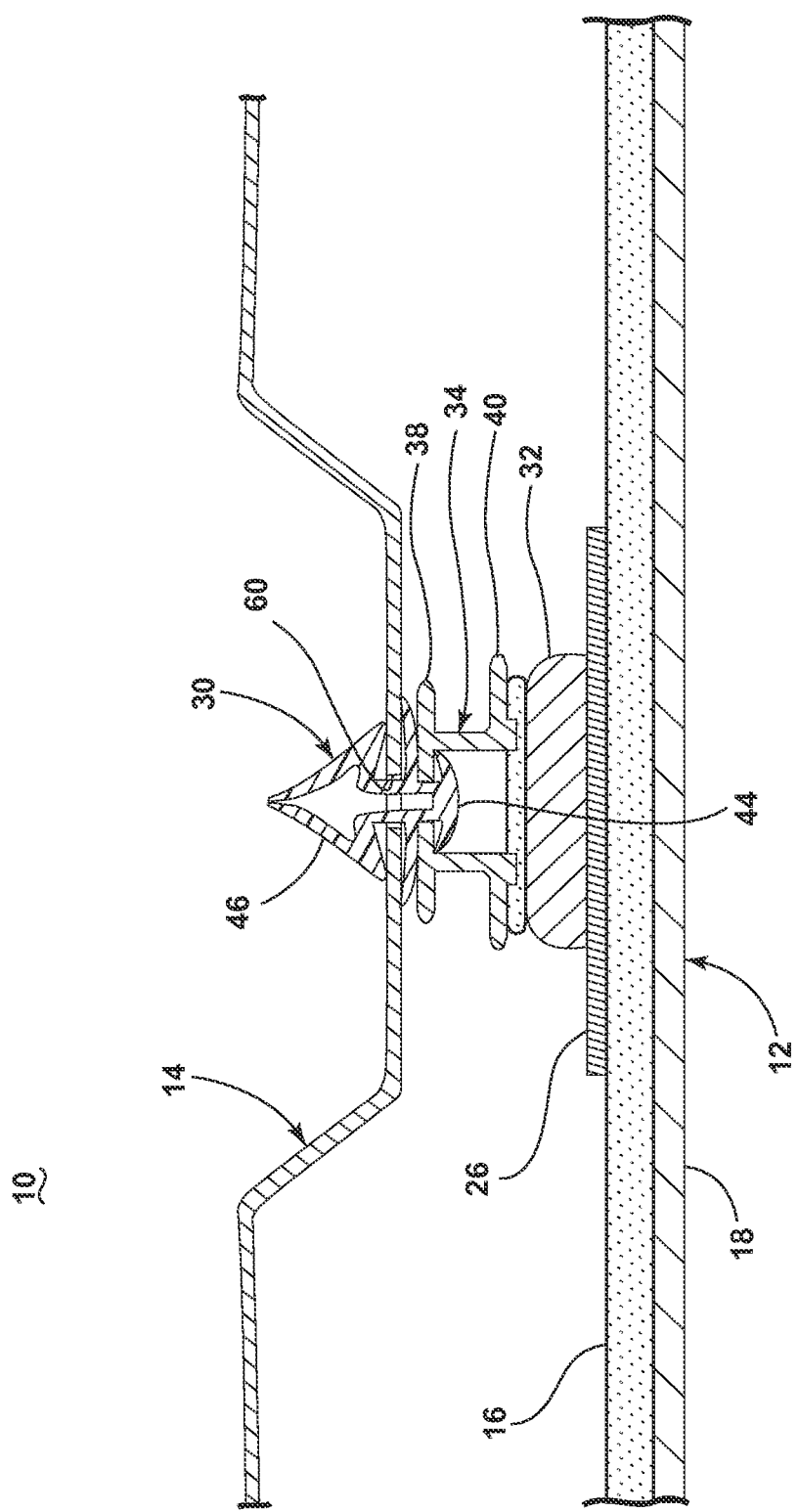
FIG. 4 is a cross-sectional side view taken along line IV-IV of FIG. 1.

Referring now to FIGS. 1 and 4, the roof structure 14, including the side rails 20, and front and rear headers 22 and 24, includes an aperture 60. In the illustrated example, the roof structure 14 includes a plurality of apertures 60 disposed therealong in which a plurality of magnetic clip assemblies 30 or 130 can be installed. The snap-in foot 46 of each magnetic clip assembly 30, according to the first embodiment, is inserted into the aperture 60, thereby retaining the magnetic clip assembly 30 to the roof structure 14, whether it be the side rail 20, front or rear header 22, 24. In this manner, the magnetic clip assemblies 30 are mounted to the non-magnetic roof structure 14. As is easily understood by one skilled in the art, the magnetic clip assembly 130, according to the second embodiment, is mounted to the roof structure 14 in a similar manner.

The headliner 12, with the ferromagnetic plates 26 bonded to the exterior surface 16 thereof, is installed during assembly of the vehicle. The plates 26 and magnetic clip assemblies 30, 130 are located on the headliner 12 and roof structure 14, respectively, so that they are aligned when the headliner 12 is installed on the vehicle. When the headliner 12 is positioned in general alignment for installation, the plates 26 will be attracted to the magnetic clip assemblies 30, 130 clipped into the non-magnetic roof structure 14, thereby enabling magnetic attachment of the headliner 12 to the non-magnetic roof structure 14. Further, the particular magnet 32 used on the magnetic clip assembly 30, 130 can be selected based on the material's magnetic magnitude, which describes how strong the magnetic attraction is. The magnets 32 must be able to attract the plates 26 with sufficient force so as to secure the headliner 12 to the non-magnetic roof structure 14 and stay secure during normal use of the vehicle. Alternatively, it is contemplated that the plates 26 can be formed of a magnetic metal having a reverse polarity with respect to the magnet 32.

It should easily be understood by one having ordinary skill in the art that the magnetic properties of the magnets 32 and the plates 26 could be switched according to another embodiment. In other words, the plates 26 could be made of a magnetic material, while the member that is the magnet 32 could be made of a ferromagnetic material. Additionally, both the magnets 32 and plates 26 could be formed of a magnetic metal as long as their polarity is reversed. In each of these described variations of component orientation, the headliner 12 is able to be mounted to the non-magnetic roof structure 14 by magnetic force.

With the industry-wide transition to lighter materials, which are often not magnetic, take aluminum for example, the ability to magnetically attach components to the vehicle body is lost. The vehicle attachment system 10 described herein enables magnetic attachment of a trim component, such as a headliner, to a non-magnetic body structure, such as a roof structure. Additionally, the vehicle attachment system 10 also provides an attachment means that does not have fasteners that are visible from within the vehicle's interior, which is a perceived craftsmanship improvement. Another benefit the vehicle attachment system 10 provides is the ease with which the headliner 12 can be blindly installed to the roof structure 14. Installation of the headliner 12 is considered to be a "blind" installation because the installer is not able to view the fasteners during installation.

It will be understood by one having ordinary skill in the art that construction of the described headliner attachment system and other components is not limited to any specific material. Other exemplary embodiments of the invention disclosed herein may be formed from a wide variety of materials, unless described otherwise herein.

It is also important to note that the construction and arrangement of the elements of the headliner attachment system as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A vehicle headliner attachment system comprising:
a headliner;
a ferromagnetic plate attached to the headliner;
a non-magnetic roof structure having an aperture facing downward;
a fastener snap-fit within the aperture;
a magnet attached to the ferromagnetic plate; and
a rigid carrier secured between the fastener and the magnet and having a top plate with a keyhole slot for laterally attaching the fastener to the rigid carrier for retaining the headliner to the non-magnetic roof structure.

2. The vehicle headliner attachment system of claim 1, wherein the rigid carrier of the magnetic clip assembly includes the top plate and a bottom plate with a space therebetween.

3. The vehicle headliner attachment system of claim 2, wherein the magnet and the fastener are disposed on opposed faces of the rigid carrier defined by the bottom plate and the top plate, respectively.

4. The vehicle headliner attachment system of claim 2, wherein the fastener includes a head attached to a skirt by a coaxially aligned barrel that is sized to engage the keyhole slot in the top plate, whereby the head is arranged on a first side of the top plate in the space between the top and bottom plates and the skirt is arranged on an opposing second side of the top plate for abutting the non-magnetic roof structure.

5. The vehicle headliner attachment system of claim 1, wherein the attachment system comprises a plurality of ferromagnetic plates spaced about the exterior surface of the headliner and a plurality of magnetic clip assemblies spaced about the roof structure.

6. The vehicle headliner attachment system of claim 5, wherein the magnetic clip assemblies attract the ferromagnetic plates with sufficient magnitude so as to secure the headliner to the non-magnetic roof structure.

7. The vehicle headliner attachment system of claim 5, wherein the ferromagnetic plates are magnetic and oriented in reverse polarity with respect to the magnetic clip assemblies.

8. A vehicle trim component attachment system comprising:
a trim component having an exterior surface;
a non-magnetic body structure having an aperture on an interior surface thereof;
a ferromagnetic plate mounted to the exterior surface of the trim component; and
a magnetic clip assembly having a carrier with a first plate spaced from a substantially parallel second plate, a fastener attached to the first plate and secured within the aperture, and a magnet adhered to the second plate and magnetically attached to the ferromagnetic plate for retaining the trim component to the non-magnetic body structure at a spaced distance, wherein the first plate includes a keyhole slot for snap-fitting the fastener to the carrier.

9. The vehicle attachment system of claim 8, wherein the fastener includes a head attached to a skirt by a barrel that is sized to engage the keyhole slot in the first plate, whereby the head is arranged on an interior side of the first plate and the skirt is arranged on an opposing exterior side of the first plate in abutting contact with the non-magnetic body structure.

10. The vehicle headliner attachment system of claim 9, wherein the magnet and the fastener are disposed on opposed faces of the carrier defined by the second and first plates, respectively.

11. The vehicle attachment system of claim 9, wherein the barrel is coaxially aligned between the head and the skirt of the fastener.

12. The vehicle attachment system of claim 11, wherein the fastener includes a foot attachment portion extending coaxially from the skirt and engaging within the aperture to mount the magnetic clip assembly to the non-magnetic body structure.

13. The vehicle attachment system of claim 12, wherein the attachment system comprises a plurality of ferromagnetic plates spaced about the exterior surface of the trim component and a plurality of magnetic clip assemblies spaced along the body structure.

14. The vehicle headliner attachment system of claim 13, wherein the magnetic clip assemblies attract the ferromagnetic plates with sufficient force so as to secure the trim component to the non-magnetic body structure.

15. The vehicle headliner attachment system of claim 14, wherein the trim component is a headliner and the body structure is roof structure.

16. A vehicle headliner attachment system comprising:
a headliner;
ferromagnetic plates attached about the headliner;
a non-magnetic roof structure having apertures spaced along an interior surface thereof in alignment with the ferromagnetic plates; and
magnetic clip assemblies, each having a fastener secured within one of the apertures, a magnet attached to one of the ferromagnetic plates, and a rigid carrier secured between the fastener and the magnet and including a top side with a keyhole slot that laterally attaches with the fastener and an opposing bottom side that attaches with the magnet to provide a space therebetween.

17. The vehicle headliner attachment system of claim 16, wherein a head of the fastener attaches to the rigid carrier and an opposing foot portion of the fastener snap-fits into one of the apertures.

18. The vehicle headliner attachment system of claim 17, wherein the non-magnetic roof structure includes a lateral member coupled with a longitudinal member, each including the apertures spaced therealong.

* * * * *